J. D. WOODS.
FISHING GIG.
APPLICATION FILED SEPT. 15, 1919.
1,334,206.
Patented Mar. 16, 1920.
3 SHEETS—SHEET 1.
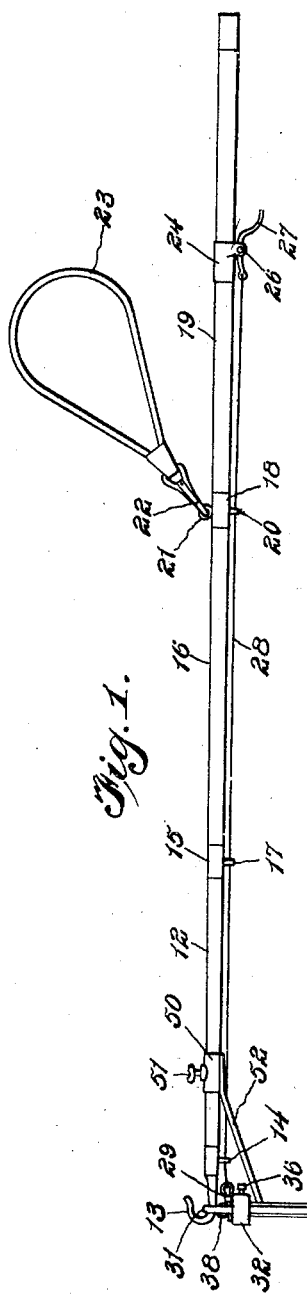
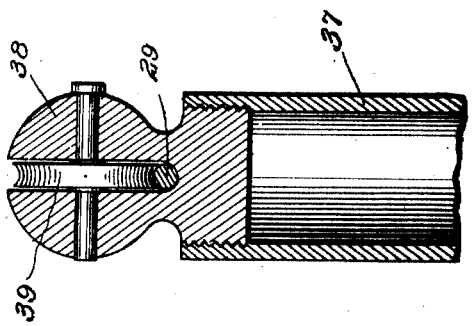
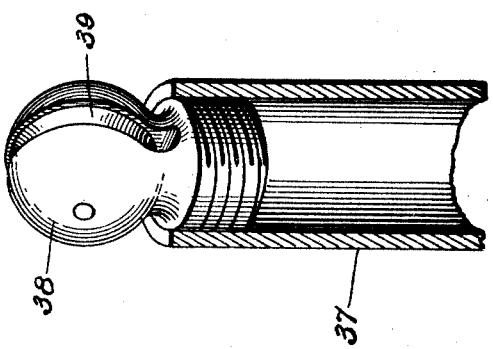
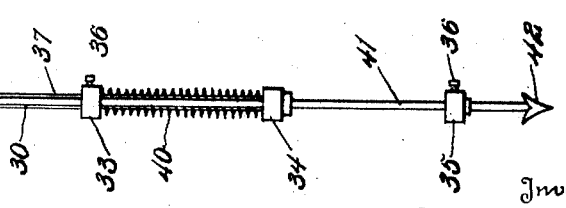
Inventor
J. D. Woods
Witnesses
A. R. Heinrichs
By Victor J. Evans
Attorney

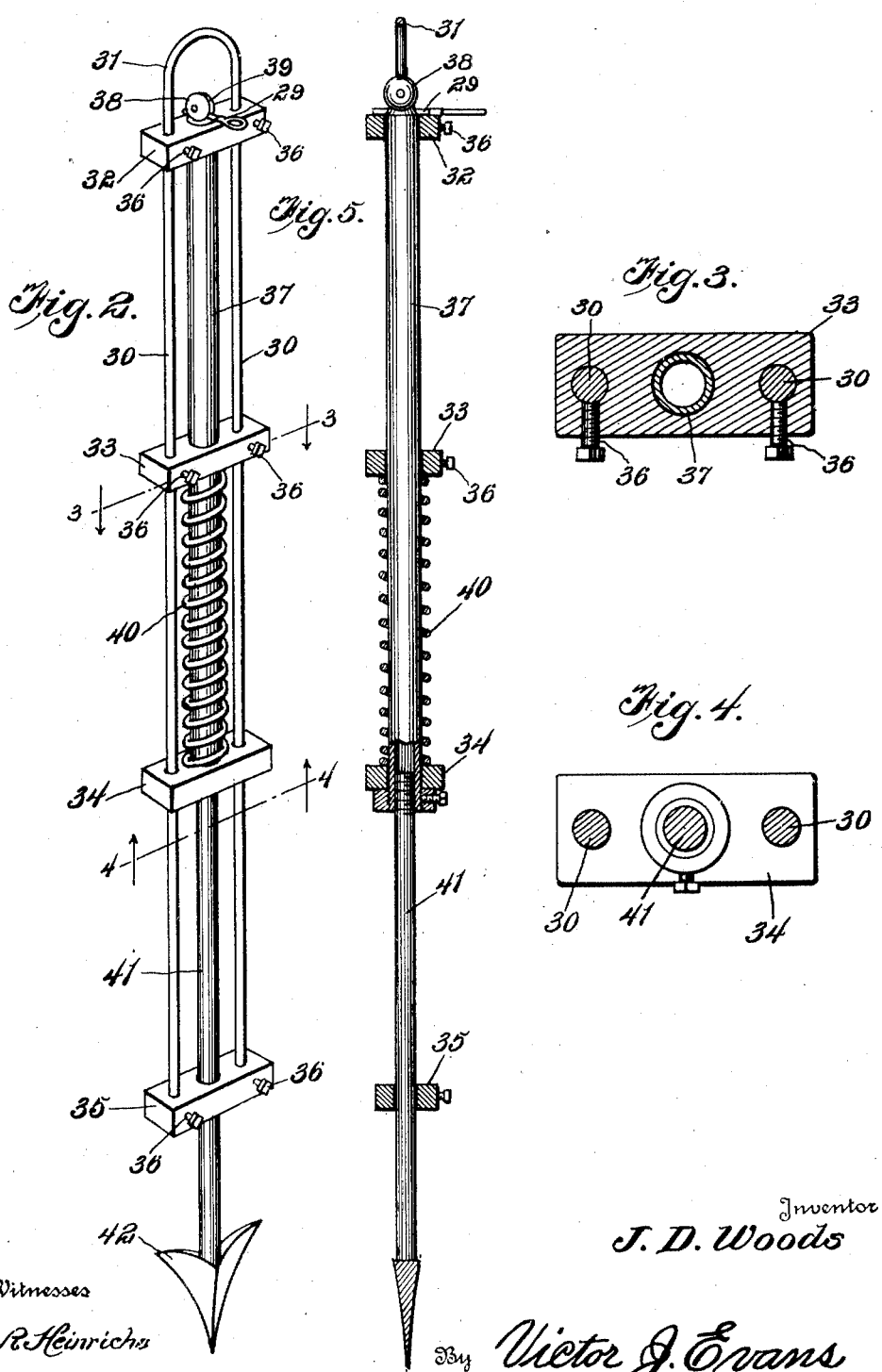

J. D. WOODS.
FISHING GIG.
APPLICATION FILED SEPT. 15, 1919.
1,334,206.
Patented Mar. 16, 1920.
3 SHEETS—SHEET 3.
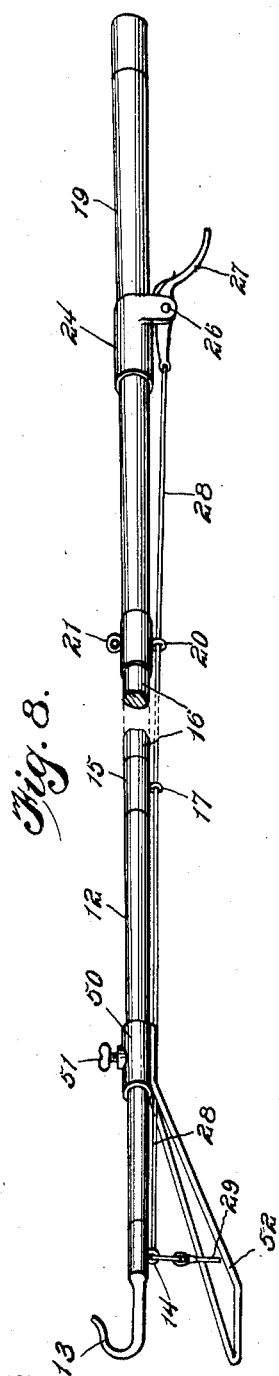
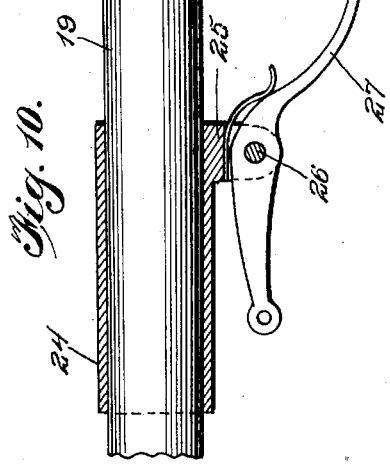
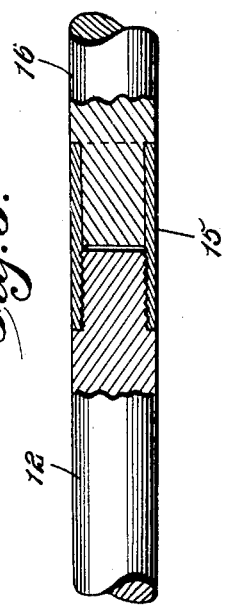
Inventor
J. D. Woods
By Victor J. Evans
Attorney
Witnesses
J. R. Heinrichs

UNITED STATES PATENT OFFICE.

JOHN D. WOODS, OF STEUBENVILLE, OHIO.

FISHING-GIG.

1,334,206. Specification of Letters Patent. Patented Mar. 16, 1920.

Application filed September 15, 1919. Serial No. 323,746.

*To all whom it may concern:*

Be it known that I, JOHN D. WOODS, a citizen of the United States, residing at Steubenville, in the county of Jefferson and State of Ohio, have invented new and useful Improvements in Fishing-Gigs, of which the following is a specification.

This invention has reference to an improved fishing gig.

The object of the invention is to produce a device of this character in which the spear member is normally held in latched position on the rod, simple means being provided for releasing the latch and permitting the spear to be projected by a spring provided for this purpose.

A further object of the invention is to provide means whereby the spring may be regulated to a nicety, and consequently the force of the projection to the spear accurately provided for.

Other objects and advantages will present themselves as the nature of the invention is better understood, reference being had to the accompanying drawings in which there is illustrated a simple and satisfactory embodiment of the improvement reduced to practice, and in which:

Figure 1 is a view of the device in its entirety.

Fig. 2 is a perspective view of the gig.

Fig. 3 is a sectional view approximately on the line 3—3 of Fig. 2.

Fig. 4 is a sectional view approximately on the line 4—4 of Fig. 3.

Fig. 5 is an approximately central longitudinal sectional view through the gig, illustrating the manner in which it is removably connected to the rod.

Fig. 6 is an enlarged detail perspective view through the upper end of the gig showing the manner in which the latching pin engages with the roller on the outer end of the spear.

Fig. 7 is a detail sectional view through the same.

Fig. 8 is an enlarged view of the rod.

Fig. 9 is a sectional view approximately on the line 9—9 of Fig. 8.

Fig. 10 is a sectional view approximately on the line 10—10 of Fig. 8.

The rod or pole of the improvement is made up of three sections. The outer section, indicated by the numeral 12 has on its outer end a hook 13 and is provided with a guide eye 14. The inner or lower end of the section 12 is threaded and the said threads are designed to be screwed in a metallic sleeve 15 upon the outer end of the intermediate section 16. The sleeve 15 is provided with a guide eye 17. The inner end of the section 16 is reduced and threaded and is screwed in a metallic sleeve 18 secured upon the outer end of the inner rod section 19. The sleeve 18 is provided with a guide eye 20 and opposite the said eye is provided with a second eye 21 to which is connected, preferably through the medium of a spring catch 22 a loop handle 23. On the section 19 is a metallic tubular member 24 that has one of its ends offset as at 25, the said offset ends being provided with ears and between these ears is pivoted as at 26 a lever 27. Preferably this lever is spring influenced in one direction and is of an angular formation so that the end thereof opposite that provided with the handle portion may be formed with an eye in which is secured a flexible element either in the nature of a core or wire, indicated by the numeral 28. This element is trained through the eyes 14, 17 and 20, the said eyes being in alinement, and on the outer end of the said element 28 is secured a pin member 29 that serves as a key for sustaining the spear of the gig against the influence of the spring for the said spear. It will be apparent that when the lever 27 is swung downwardly or toward the inner end of the rod section 19 the flexible element will be drawn taut and consequently the key 29 will be moved downwardly of the rod.

The frame of the gig includes a U-shaped rod, the arms 30 of which are parallel, and the rounded connecting member for the rod, indicated for distinction by the numeral 31 is arranged at the upper end of the frame. The arms 30 are of a comparatively great length and have arranged thereon slidable blocks 32, 33, 34 and 35. The blocks 32, 33 and 35 are adjustably secured to the arms 30 by binding bolts 36, while the block 34 is free from engagement with the arms of the frame. The spear comprises an upper section which is in the nature of a tube and which is indicated by the numeral 37. On the upper or outer end of the tube is threadedly or otherwise secured a spherical head 38. This head is bifurcated and journaled in the bifurcation is a groove wheel 39. The lower wall of the bifurcation is concaved so that the key may be readily inserted in the space between the said concavity and the groove wheel, and at the same time frictionally engaging with these elements. The key overlying the upper block 32 prevents the downward movement of the spear, or a movement outward of the frame. On the section 37 of the spear, between the block 34 and the block 33 is a helical spring 40 which, when the key is released, is designed to project the block 34 in the direction of the block 35, and likewise project the spear outward of the frame. The shank of the lower section of the spear is indicated by the numeral 41 and may have a swivel or threaded connection with the tubular upper section 37. The spear head 42 is formed on the outer end of the shank 41.

If desired, the arms 30 of the frame may have their outer ends enlarged to limit the outward movement of the block 35. The block 35 is, however, as stated, adjustable with respect to the arms of the frame and as the block 34, when the spear is released is designed to contact with the block 35 the limit of the projection of the spear is thus regulated. By adjusting the block 33 on the arms of the frame the tension of the spring 40 is regulated. The element 31 of the frame is connected to the hook at the outer end of the pole, and the device is operated in the well known manner.

It is thought, from the foregoing description, when taken in connection with the drawings, the simplicity of the construction and the advantages thereof will be readily apparent without further detailed description.

On the outer section of the rod there may be arranged, as illustrated in the drawings, a support for the gig. This support includes a sleeve 50 which is held on the rod by a thumb screw 51. From the collar there extends a substantially U-shaped steel wire member 52 that is arranged at an angle with respect to the collar, and consequently at an angle with respect to the rod. The arms of the said U-shaped supporting member are connected to the outer end of the collar and are gradually spaced away from each other to the connecting element for the arms.

Having thus described the invention, what is claimed as new, is:—

In a fishing gig, a sectional pole having a hook at the outer end thereof, eyes on the sections of the pole, a lever on the inner section of the pole in a line with said eyes, a hand loop on the said inner section opposite the lever, a substantially U-shaped gig frame connected to the hook of the pole, adjustable blocks slidable thereon, means for securing said blocks adjusted on the frame, a sliding block on the frame free from engagement therewith and in the path of contact with one of the fixed blocks, a spear comprising a sectional member guided through the first mentioned blocks and fixed to the last mentioned block, said spear having its outer end provided with a head which is bifurcated, a groove wheel journaled in said bifurcation, a key comprising a pin member passing through the bifurcation and engaged by the lower wall thereof and by the groove wheel, a flexible element connected to said key, and said element being guided through the eyes of the pole and secured to the lever thereon.

In testimony whereof I affix my signature.

JOHN D. WOODS.